United States Patent
Leigel-Seitz

[11] 3,719,279
[45] March 6, 1973

[54] MOUNTING FOR PREFABRICATED, LARGE SURFACE, INDIVIDUAL FILTERING LAYERS IN HORIZONTAL LAYER FILTERS, HAVING LARGE DIMENSIONED FILTER ELEMENTS

[75] Inventor: Gunther Leigel-Seitz, Bad Kreuznach, Germany

[73] Assignee: Seitz-Asbest-Werke Theo & Geo Seitz, Bad Kreuznach, Germany

[22] Filed: Sept. 17, 1971

[21] Appl. No.: 181,369

[30] Foreign Application Priority Data

Sept. 23, 1971 Germany..................P 20 46 827.3

[52] U.S. Cl. ................................................210/231
[51] Int. Cl. .............................................B01d 25/12
[58] Field of Search.......................210/224, 226–231

[56] References Cited

FOREIGN PATENTS OR APPLICATIONS 1,143,088   9/1957   France ................................210/231

Primary Examiner—Reuben Friedman
Assistant Examiner—T. A. Granger
Attorney—Walter Becker

[57] ABSTRACT

A mounting for prefabricated, large surface, individual filtering layers, which form filter packets when sandwiched between adjacent large dimensioned vertical filter elements in a complete layer filter, said mounting being characterized primarily in that each individual filtering layer is held vertically between the adjacent filter elements by a detachable connection comprising interengaging elements which are arranged above the filter packet. The arrangement is such that one connecting element is situated on the layer edge which rises beyond the upper horizontal border of the filter elements, while the other connecting element is arranged on the upper horizontal border of one or above both filter elements of a filter packet.

9 Claims, 4 Drawing Figures

PATENTED MAR 6 1973 3,719,279

MOUNTING FOR PREFABRICATED, LARGE SURFACE, INDIVIDUAL FILTERING LAYERS IN HORIZONTAL LAYER FILTERS, HAVING LARGE DIMENSIONED FILTER ELEMENTS

The present invention relates to a mounting for prefabricated, large surfaced, individual filtering layers in horizontal layer or sheet filters with a plurality of vertical large dimensioned filter elements such as sheets, plates, racks, or the like, which in a complete closed filter with layers respectively inserted between adjacent elements respectively form filter packets.

Individual filtering layers are known in smaller sheet filters. Rods are generally provided for mounting the layers, which rods extend singly or parallelly below the filter packets. The layers inserted from above between the filter elements are supported by these rods and assume a vertical position of use. In contrast thereto, the large surface filtering layers required in larger sheet layer filters are generally double layers, each with a symmetrical layer surface on both sides of a prefabricated folding back. For purposes of filtration, the double layers, known as folding sheets, are respectively placed in U-forms over a filter element, in which instance, the layer surfaces are suspended on both sides of the element vertically in front of the sides of the element, and the upper horizontal element border, on which the folding back rests, forms the layer mounting.

Prefabricated filtering layers generally represent products of organic or inorganic fibers or any combination of these fibers, if desired, with the addition of pulverous substances, the structure of which, depending on the selected combination or synthesis, is generally porous. This structure is, above all with large dimensioned double layers, exposed to considerable tensile stresses which act vertically upon the suspended filter surfaces, said tensile stresses leading to damage and precluding the use of the layers. The areas near the folding back weakened by parallel scoring or grooving as well as the merging areas with the symmetrical filter surfaces on both sides of the back are critical, especially with wet double layers. The danger of damage present anyhow is still further increased for the above mentioned areas by the fact that the heretofore known layer mounting permits a shearing effect during the closing of the filter, inasmuch as the edges of the upper horizontal element border, upon which the layer back with the angled-off filter surfaces rests, act in particular upon these critical areas.

Since, because of the above mentioned shortcomings, the known mounting is only useful for double layers up to a certain size and since beyond this size, further disadvantages have to be put up with, large surface, individual filtering layers are more expedient for large dimensioned layer filters.

It is an object of the present invention to produce an advantageous mounting for such large surface filtering layers.

This object and other objects and advantages of the invention will appear more clearly from the following specification, in connection with the accompanying drawings, in which.

Figure 1:
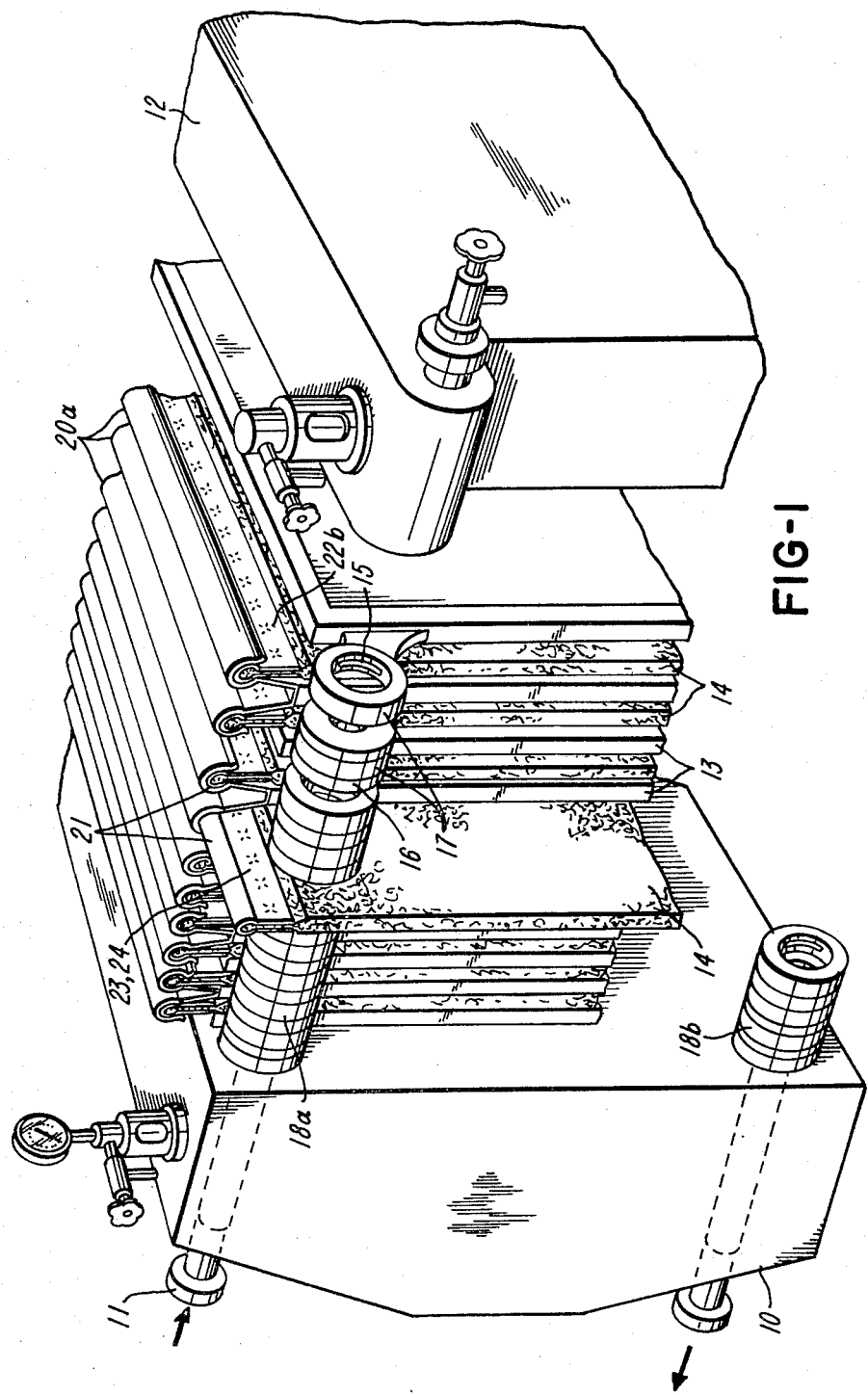
FIG. 1 is an isometric view of a filter with the mounting according to the invention for large surface filter layers.
Figure 4:
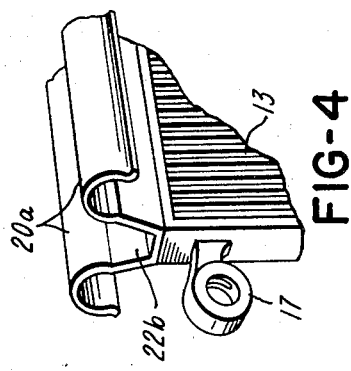
FIG. 4 shows a portion of a filter element with a double guiding rail.
Figure 3:
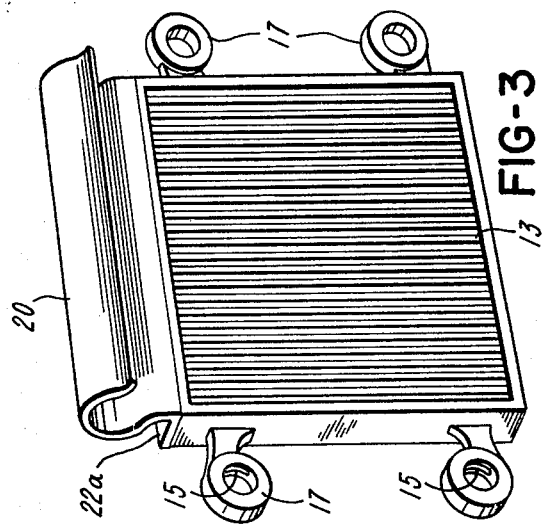
FIG. 3 illustrates a filter element with a single guiding rail.
Figure 2:
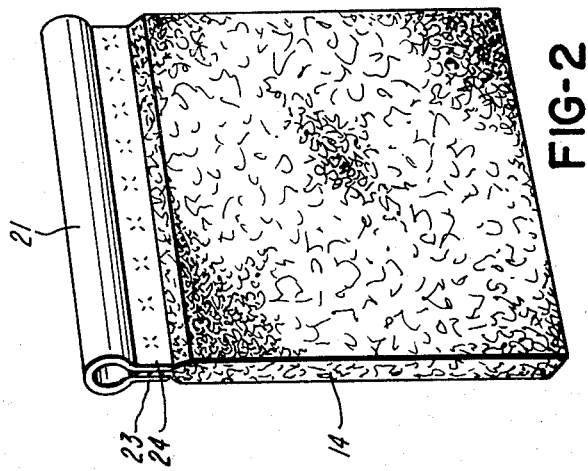
FIG. 2 shows a filter layer with an insertion rail according to the invention.

The mounting according to the invention is characterized primarily in that each individual layer is held vertically between the adjacent filter elements by a detachable connection comprising elements which engage each other above the filter packet. The arrangement is such that one connecting element is arranged on that layer edge which rises beyond the upper horizontal border of the filter elements, while the other connecting element is arranged on the upper horizontal border of one or above both filter elements. With the thus obtained vertical layer mounting the above mentioned drawbacks occurring during use of the double layers will be avoided, and by means of the connecting elements respectively associated with the individual layers possibilities are created to strengthen or stiffen the layer in the area of the mounting. In addition thereto, a simpler handling during insertion of the layers into the filter packet is obtained, and especially, it will be possible to manufacture individual layers with surface dimensions which may considerably exceed the size of the heretofore known double layers, inasmuch as the width of the endless circulating carriers of the layer manufacturing machines may be fully used for the surface size of the individual layers.

According to a preferred embodiment of the invention, the detachable connection of the type of a push guide comprises a guide rail and a molding. The guide rail extends all the way over the width of the filter element, has a downwardly opening profile, and is secured upon the upper horizontal border of one of the adjacent filter elements. The molding is arranged on the raised layer edge and fitted with a profile which is insertable into the rail profile. To this end, according to a further embodiment of the invention, the molding profile is provided with flaps, or ears, hanging down vertically on both sides of the layer edge, said flaps and molding being fastened to the layer by means of clamps, rivets, adhesive means, by sewing, stitching, or the like. According to a further development of the preferred embodiment of the invention, the rail profiles for each two adjacent layers are secured to a common U- or V-shaped holder which in its turn is arranged upon the upper horizontal border of the element surrounded by the adjacent layers. Of course, the rail profiles may also be situated on individual holders or one common holder, in which instance these holders may extend above the upper horizontal element border transverse to or along the filter elements. It is also within the scope of the invention to manufacture the proposed detachable connection for vertical mounting of the individual layers as connecting elements adapted to interengage each other. Said connecting elements are arranged on the one hand upon the upper horizontal filter element border or upon a common holder above the filter element border in the form of hooks, pins, or the like, and on the other hand are arranged on the raised protruding layer edge in the form of oppositely located eyes, bores, or the like.

Referring now to the drawings in detail, the partially illustrated large dimensioned horizontal sheet filter comprises a stationary end plate 10 provided with fluid inlet means and a movable end plate 12 on the opposite side which is operable by tightening means not shown. In the space between the end plates 10 and 12 there is arranged a plurality of vertical plates, racks, or similar filter elements 13 which are resting on supporting or suspension means which are not shown. In a complete or closed filter, the filter elements 13 together with respectively interposed large surface filter layers or filter sheets 14 form a filter packet. In this way the eyes 17, generally arranged in the upper and lower region of the element 13 and provided with passages 15, together with gaskets or sealing washers 16, form ducts or conduits 18a, 18b. There are two upper conduits 18a which feed the cloudy fluid to the filter packets, and there are two lower conduits 18b for carrying off the filtrate after the cloudy liquid has passed through the respective filter sheet 14.

A detachable connection of the type of a push-in guide serves for vertically mounting the filtering layers or sheets 14 respectively inserted between each two adjacent elements 13. Said connection comprises a guide rail 20 with a downwardly opening profile, and a molding 21 with a section adapted to be inserted into the rail 20.

The rail 20, which may have any profile adapted for vertical layer mounting, such as U, Y, and T forms, is secured to or upon the upper horizontal border of an adjacent element 13 and extends over the width of the element. In this connection, the rail 20 may be arranged on a holder. As illustrated, to mount two layers 14 hanging vertically on both sides of an element 13, a V- or U-shaped holder 22, 22a, 22b situated upon the surrounded element is expedient. Rails 20, 20a for the layers 14 are respectively secured to the upwardly directed legs of the holders 22, 22a, 22b.

The molding 21 situated on the filtering layer 14 extends along the layer edge protruding beyond the upper horizontal element border and expediently has two flaps or ears 23, 24 hanging down on both sides of the layer edge. The flaps in turn are connected to the layer 14 by clamping, riveting, adhesives, sewing, stitching, or the like, said flaps strengthening or reinforcing and stiffening the layer in the area of the detachable connection 20, 21.

Instead of the rail 20 situated on the element 13, the vertical layer mounting according to the invention may also be realized by rails 20a which extend along the upper horizontal element border and are connectable to common or multiple holders, which in their turn extend along or transverse to the filter packet. Also embraced by the invention are detachable connections of sections adapted to interengage each other. Said sections on the one hand are situated on the upper horizontal element border or on a common holder above the element border in the form of a plurality of hooks, pins, or the like, and on the other hand are situated on the upper horizontal layer edge in the form of eyes, bores, or the like, located opposite said hooks, pins, or the like.

It is, of course, to be understood that the present invention is, by no means, limited to the specific showing in the drawings, but also comprises any modifications within the scope of the appended claims.

What I claim is:

1. In combination with a large dimensioned horizontal layer filter having a plurality of substantially parallel and vertical alternating filtering layers and filter elements, a mounting for said filtering layers, which includes; a plurality of first connecting means respectively connected to said filtering layers, and a plurality of second connecting means respectively connected to said filter elements and adapted to detachably engage and support said first connecting means so as to hold the latter in substantially vertically suspended position, said first connecting means being respectively connected to the upper edge portion of the pertaining filtering layers, said second connecting means being respectively connected to the upper portion of said filter elements, each of said second connecting elements being adapted to slidably receive at least one of the respective adjacent first connecting means, each of said second connecting means forming at least one hollow rail opening in the downward direction and having its hollow portion adapted slidably to engage at least one of the respective adjacent first connecting means.

2. A mounting according to claim 1, in which each of said first connecting means straddles the upper edge of the pertaining filtering layer, and in which each of said second connecting means is adapted to straddle at least one of the respective adjacent first connecting means.

3. A mounting according to claim 1, in which said second connecting means are individually respectively connected to said filter elements.

4. A mounting according to claim 1, in which said second connecting means are grouped into pairs, extending above and at opposite sides of one filtering element each for receiving the respective first connecting means.

5. A mounting according to claim 1, in which said first and second connecting means have complementary portions of approximately semicircular cross sections slidably and pivotally engaging each other.

6. A mounting according to claim 1, in which said first and second connecting means include interconnectable hook and pin means.

7. In combination with a large dimensioned horizontal layer filter having a plurality of substantially parallel and vertical alternating filtering layers and filter elements, a mounting for said filtering layers, which includes: a plurality of first connecting means respectively connected to said filtering layers, and a plurality of second connecting means respectively connected to said filter elements and adapted to detachably engage and support said first connecting means so as to hold the latter in substantially vertically suspended position, each of said first connecting means straddling the upper edge of the pertaining filtering layer, each of said second connecting means being adapted to straddle at least one of the respective adjacent first connecting means, each of said second connecting means comprising two hollow rails, and supporting means common to said two hollow rails and supported by a filter element.

8. A mounting according to claim 7, in which said first connecting means are respectively connected to the upper edge portion of the pertaining filtering layers, and in which said second connecting means are respectively connected to the upper portion of said filter elements, each of said second connecting elements being adapted to slidably receive at least one of the respective adjacent first connecting means.

9. A mounting according to claim 7, in which said first connecting means are provided with lateral flaps connected to the sides of the respective pertaining filtering layer.

* * * * *